(12) United States Patent
Wilt

(10) Patent No.: US 8,639,892 B1
(45) Date of Patent: Jan. 28, 2014

(54) SELECTIVELY INHIBIT PAGE USAGE BIT UPDATES

(75) Inventor: Nicholas P. Wilt, Rochester, NY (US)

(73) Assignee: NVIDIA Corporation, Santa Clara, CA (US)

( * ) Notice: Subject to any disclaimer, the term of this patent is extended or adjusted under 35 U.S.C. 154(b) by 1845 days.

(21) Appl. No.: 11/611,801

(22) Filed: Dec. 15, 2006

Related U.S. Application Data

(63) Continuation-in-part of application No. 11/312,151, filed on Dec. 19, 2005.

(51) Int. Cl.
*G06F 12/00* (2006.01)

(52) U.S. Cl.
USPC .................................. 711/156; 711/E12.002

(58) Field of Classification Search
USPC .................................. 711/156, 154, E12.002
See application file for complete search history.

(56) References Cited

U.S. PATENT DOCUMENTS

| | | | |
|---|---|---|---|
| 4,035,778 A * | 7/1977 | Ghanem | 711/133 |
| 5,801,717 A * | 9/1998 | Engstrom et al. | 345/539 |
| 5,990,914 A | 11/1999 | Horan et al. | |
| 6,330,654 B1 | 12/2001 | LaBerge et al. | |
| 6,434,685 B1 * | 8/2002 | Sexton et al. | 711/206 |
| 6,526,497 B1 | 2/2003 | LaBerge et al. | |
| 6,907,600 B2 * | 6/2005 | Neiger et al. | 717/139 |
| 7,447,997 B2 * | 11/2008 | Colle | 715/764 |
| 7,519,781 B1 | 4/2009 | Wilt | |
| 2002/0093507 A1 | 7/2002 | Olarig | |
| 2006/0092165 A1 * | 5/2006 | Abdalla et al. | 345/545 |

* cited by examiner

*Primary Examiner* — Pierre-Michel Bataille
(74) *Attorney, Agent, or Firm* — Kilpatrick Townsend & Stockton, LLP

(57) ABSTRACT

Circuits, methods, and apparatus that inhibit the collection or updating of page characteristics where such information is not useful. One example inhibits the updating of page usage information for pages that are to be kept resident in memory and not swapped to disk. The pages for which page usage or other characteristic updates are to be suppressed can be identified in a number of ways, including using a set range of addresses, bits in page directory entries, bits in page table entries, one or more address registers, or one or more segments.

20 Claims, 16 Drawing Sheets

| | 518 | 519 | 514 | 516 | 520 | |
|---|---|---|---|---|---|---|
| | 0 | 0 | 1 | 1 | 2 | 6 |
| | 1 | 0 | 1 | 1 | 3 | 5 |
| | 0 | 0 | 0 | 0 | 0 | 4 |
| | 1 | 0 | 0 | 0 | 1 | 3 |
| | 1 | 1 | 1 | 0 | 3 | 2 |
| | 0 | 0 | 0 | 1 | 1 | 1 |
| | 0 | 1 | 0 | 0 | 1 | 0 |

Figure 5B

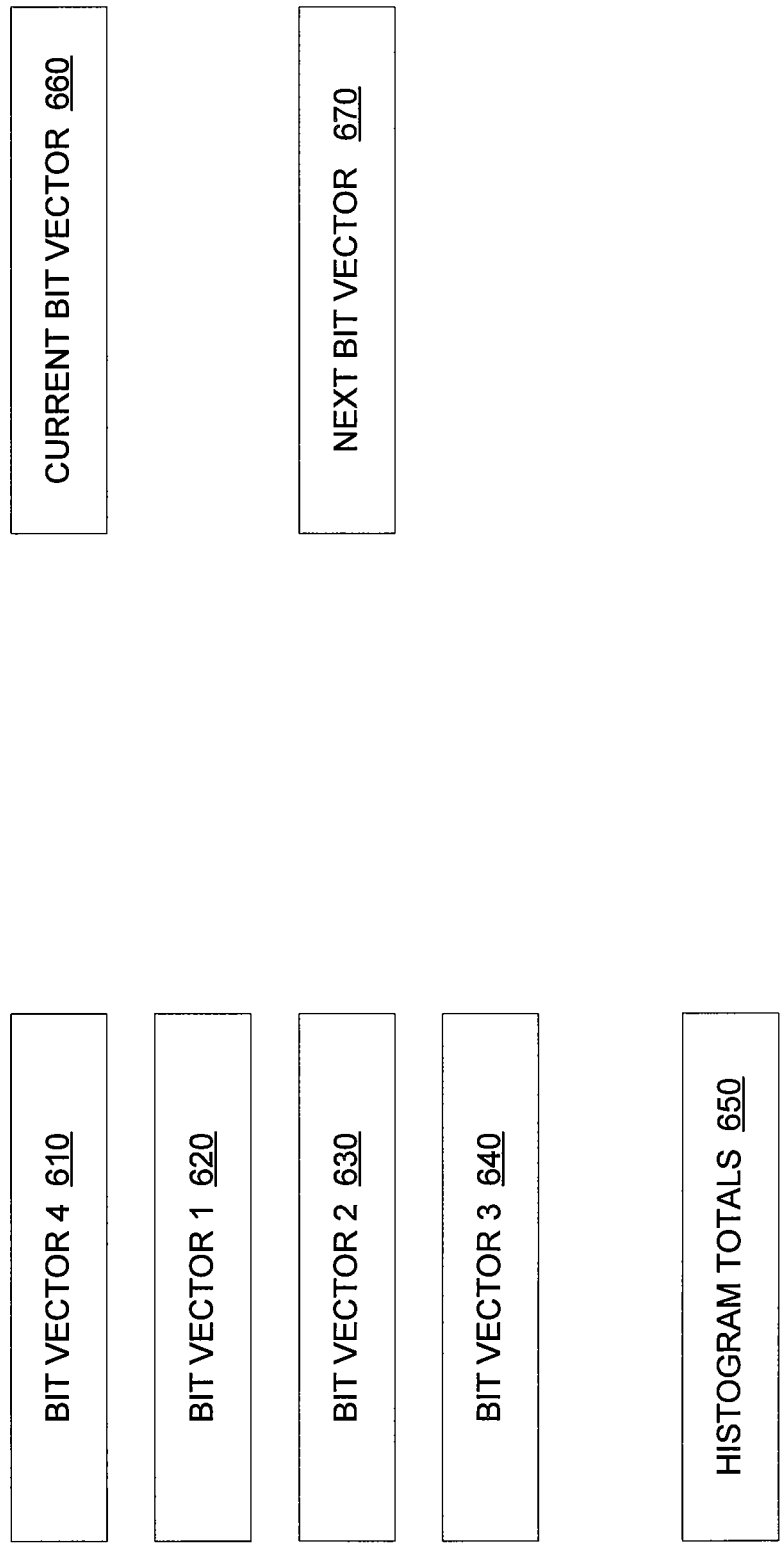

SELECTIVELY INHIBIT PAGE USAGE BIT UPDATES

CROSS-REFERENCES TO RELATED APPLICATIONS

The application is a continuation-in-part of co-owned and co-pending U.S. patent application Ser. No. 11/312,151, titled "Physically-Based Page Characterization Data," filed Dec. 19, 2005, by Wilt, which is hereby incorporated by reference.

BACKGROUND

The present invention relates generally to memory management and more particularly to a more efficient storage of memory management characteristics for data in memory.

The amount of data needed by applications running in a computer system has greatly increased the past few years, and the rate of this increase shows no signs of abating. To handle this data, computer systems need to incorporate improved ways to manage data in memory.

Data stored in memory is typically arranged in pages. These pages are stored at physical addresses in one or more memory devices, for example one or more DRAMs and hard disk drives. A DRAM can only store a limited amount of data, but is able to quickly provide it for use by an application. A hard disk drive stores a great deal of data, but is slower to provide it.

Access times make DRAM memory the more desirable destination, but space is short. Accordingly, pages that are not needed by an application can be moved from DRAMs to a higher level of memory, such as a hard disk drive. Similarly, when a page is needed but not available in DRAMs—a page fault—the page can be read back from the disk to the DRAM. When pages are swapped in this manner, their physical addresses change.

It is undesirable and inefficient for applications running on a computer system to keep track of these changing physical addresses. Thus, applications use virtual addresses, which may remain static. Virtual addresses can be translated to physical addresses using a translation lookaside buffer, which includes a number of page table entries. As a page moves, the page table entry is updated.

Page table entries can be used to store other characteristics of a page as well as its physical address. A virtual memory manager (VMM) can use these characteristics in managing the data in memory. But storage of these characteristics can be complicated, requiring complex software and hardware.

Moreover, some characteristics do not need to be tracked for some pages. For example, page usage data does not need to be tracked for pages that are not to be swapped to disk. Thus, what is needed are circuits, methods, and apparatus that provide an efficient storage of these characteristics and inhibit their updating in circumstances where updated information is not useful.

SUMMARY

Accordingly, embodiments of the present invention provide circuits, methods, and apparatus that inhibit the collection or updating of page characteristics where such information is not useful. An exemplary embodiment of the present invention inhibits the updating of page usage information for pages that are to be kept resident in memory and not swapped to disk.

One such exemplary embodiment of the present invention tracks page usage information using a bit vector. The bit vector uses physical addresses and tracks pages resident in memory. Various embodiments use two bit vectors, where one vector is written to while the other is read from. Sill others use multiple vectors whose entries are accumulated to generate histograms.

Further embodiments of the present invention inhibit the collection or updating of page usage data where such data is not useful. For example, some pages in memory are to be kept in memory until they are no longer needed, after which they are deleted or overwritten. These pages are not to be stored on the disk. Accordingly, usage data for these pages is not useful and, to conserve resources, its collection or updating is thus inhibited or suppressed. Such pages may include display data in a frame buffer, display data received from an external source, such as video data received externally, or other such data.

The pages for which page usage or other characteristic updates are to be suppressed can be identified in a number of ways. One exemplary embodiment of the present invention uses a specific range of addresses, where usage data for the pages in the range of addresses is not updated. Another embodiment uses bits in page director entries, while another uses bits in various page table entries. Another embodiment of the present invention uses one or more address registers, where each register identifies a range of addresses for which usage updates are to be inhibited. Yet another embodiment uses one or more segments or context DMAs to identify ranges of addresses for which usage updates are to be inhibited.

Various embodiments of the present invention may incorporate one or more of these and the other features described herein. A better understanding of the nature and advantages of the present invention may be gained with reference to the following detailed description and the accompanying drawings.

BRIEF DESCRIPTION OF THE DRAWINGS

FIGS. 5A and 5B illustrate a method of overriding a bit vector and updating a histogram value according to an embodiment of the present invention;

FIG. 6 illustrates a histogram including an array of bit vectors, as well as two bit vectors that may be used in updating the histogram according to an embodiment of the present invention;

DESCRIPTION OF EXEMPLARY EMBODIMENTS

Figure 1:
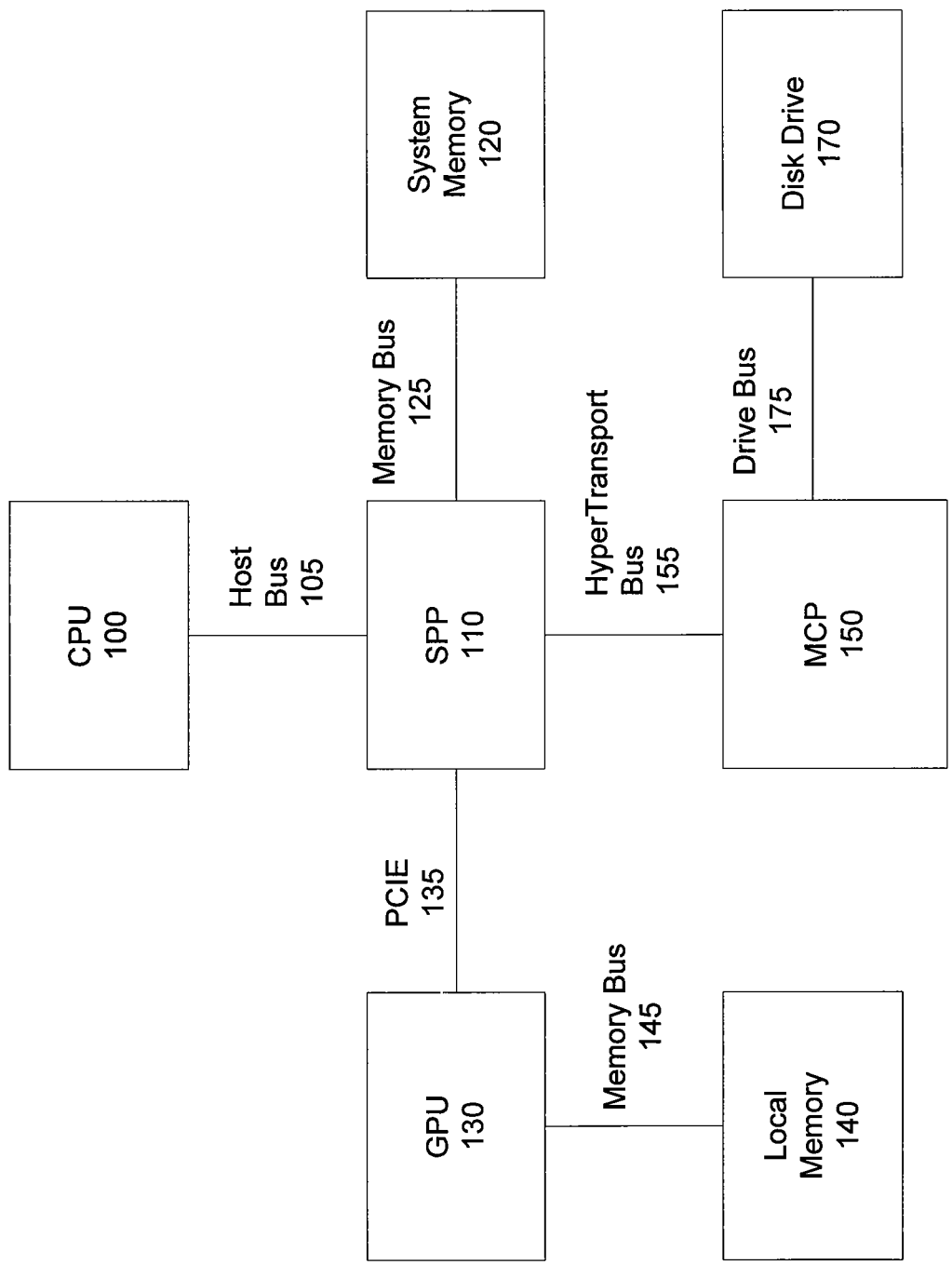
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, MCP 150, and hard disk drive 170.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network and internal and peripheral devices (not shown) as well as hard disk drive 170 to the remainder of the computer system. The graphics processing unit 130 receives data over the AGP or PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation or other supplier, and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Embodiments of the present invention may be used to improve the graphics processing unit 130. Also, other systems and circuits are improved by the incorporation of embodiments of the present invention. For example, the GPU 130 and SPP 110 may be combined as an integrated graphics processor or IGP. This device is similarly improved by the incorporation of embodiments of the present invention. Moreover, the CPU 100 and other types of processors, such as video, audio, or general purpose processors, and other types of processors and circuits may be improved by the incorporation of embodiments of the present invention. Also, while embodiments of the present invention are well suited to managing memory data for video and graphics applications, other types of data in audio or other applications may be similarly improved. Further, other types of circuits will be developed, or are currently being developed, and these may also be improved by the incorporation of embodiments of the present invention.

Again, applications running on the CPU 100, GPU 130, or other circuit, store data in memory, where the data is arranged in pages. These pages may be stored in the fast, easily accessible DRAM based memory such as the system memory 120 or graphics memory 140, or in the slower, less accessible disk drive 180. Again, it is desirable to store data being used by an application in the faster DRAM memory. If data is not being used, it can be swapped out to disk, while if it is needed, it can be brought in from the disk and stored in DRAM.

The data stored in these locations have physical addresses that depend on the physical location of the page. Since it is undesirable for an application to track these address changes, applications use virtual addresses, which can then be translated to physical addresses. An example showing the translation of virtual addresses to physical addresses is shown in the following figure.

Figure 2:
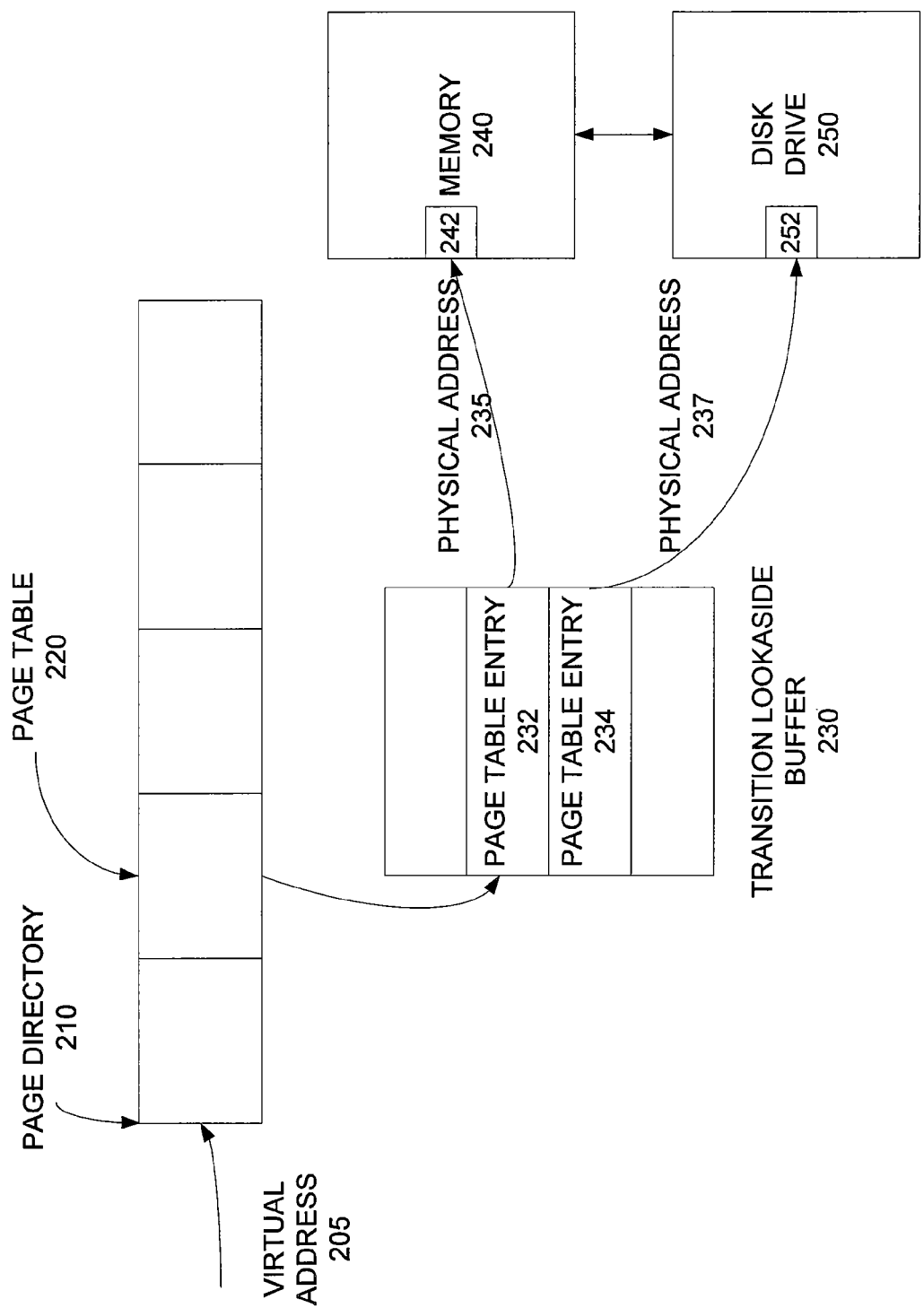
FIG. 2 is a diagram showing the translation of a virtual address to a physical address which identifies a location a memory.

FIG. 2 is a diagram showing the translation of a virtual address to a physical address which identifies a location a memory. This figure includes a page directory 210 that includes a number of page tables 220. Each page table includes a number of page table entries, each of which include a physical address in a memory, such as the address 242 in memory 240 or the address 252 in disk drive 250.

Whether a page has been used can be tracked using page usage bits. If a page is used, its page usage bit is set. Both page usage bits and physical addresses can be stored in page table entries, along with other types of data that characterize a page. Examples of other data that may be stored in a page table entry include dirty bits that indicate whether a page has been updated in cache, compression bits that indicate whether data in the page is compressed, and bits that indicate whether data in a page may be cached.

Software know as a virtual memory manager sweeps these page tables 220 to determine, among other things, which are candidates for eviction, that is, it checks page usage bits to determine which pages are not being accessed such that they can be replaced in the event of a page fault.

But it is difficult to store this information in virtual space. Also, data needs to be stored for each virtual page, whether it is physically located in DRAM or on disk. Accordingly, an embodiment of the present invention stores page usage or other characterization data post translation using physical addresses. In this way, only those pages that reside in DRAM memory are stored.

This characterization data can be stored using contiguous or noncontiguous physical addresses. The addresses may be linear, as in a vector, or as an array. The data may be stored using various banks, giving the resulting data structure a three-dimensional quality. Examples of contiguous and non-contiguous bit vectors are shown in the next figure.

Figure 3A:
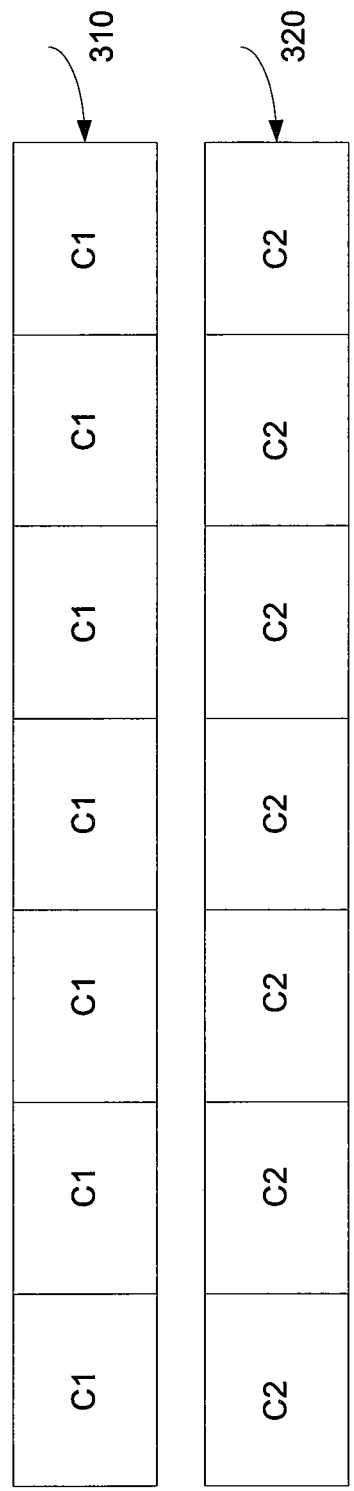
FIGS. 3A and 3B illustrate bit vectors that may be used in an embodiment of the present invention.
Figure 3B:
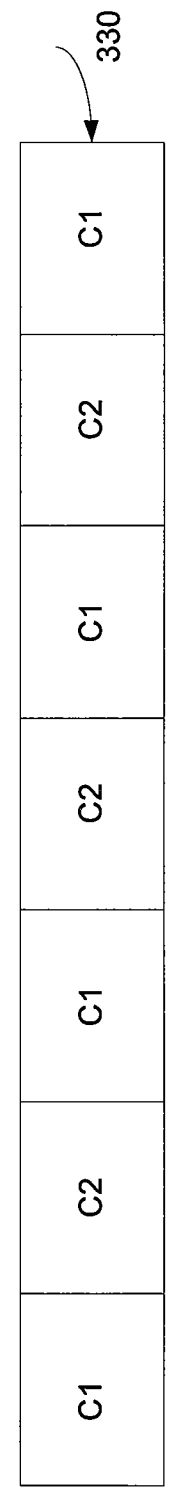

FIGS. 3A and 3B illustrate bit vectors that may be used in an embodiment of the present invention. FIG. 3A includes two vectors 310 and 320. These vectors include a number of bits corresponding to characteristics for pages in memory. In this example, the characteristics are referred to as C1 and C2. In other embodiments, each of these characteristics may refer to parts of pages, or multiple pages in memory.

Various characteristics for pages in memory may be tracked using bit vectors 310 and 320. For example, these characteristics may be page usage information, reflecting whether a page and memory has been accessed during a preceding period of time. These vectors may also store information regarding whether a page and memory has been updated in a cache, such as a cache and a central processing unit or graphics processing unit.

Other information may be stored in these bit vectors. For example, graphics information such as pixel values, texels, and the like are often compressed. A status data bit indicating whether this data is stored in a compressed format can be stored along with the data itself. This data may be referred to as an annotation, and a vector or array storing a number of these status of bits may be referred to as an annotation data structure. Still other information may be stored in these bit vectors. For example, some types of data, such as graphics data should not be stored in a cache. Accordingly, page table entries may include bits indicating whether the data is cacheable. These bits may be stored in a bit vector, such as the bit vectors 310 or 320.

In FIG. 3A, the characteristics C1 and C2 are stored in a contiguous manner in bit vectors 310 and 320. In other embodiments, the data that may be stored in a noncontiguous fashion, such as shown in the following figure.

In FIG. 3B, two characteristics are stored in an interleaved manner in bit vector 330. Still other combinations are possible, for example 3, 4, or more characteristics may be stored in a bit vector such as the bit vector 330, and these characteristics may be stored in a number of arrangements.

These bit vectors may be generated by different circuits such as the circuits in FIG. 1, and stored in various memory locations. For example, the CPU 100 may generate and store this information in the system memory 120. Also, the GPU 130 may generate and store this in the graphics memory 130, or in a video memory in the system memory 120, while the SPP 110 may also store this in the system memory 120. Data can be written from these devices to the memory using a frame buffer interface on the device itself or a frame buffer interface that is on another device.

In other embodiments, this data may be stored on-chip, since these vectors are reasonably sized. For example, given a 4 kbyte page size, 1 gigabit of memory can be tracked using $(10^9)/(8(4\times10^3))$ or 32 k bits, where ^ is a symbol meaning "to the power of."

Depending on the exact implementation, these vectors may need to be translated back to virtual space for use by a CPU. However, CPUs are sufficiently fast at this time that this task should not be unduly burdensome.

Again, only characteristics of pages residing in DRAM memory are stored. Characterization data for pages that are on disk is not needed. For example, it is not of interest whether a page on disk has been accessed; if it is not accessed, it will be brought in from disk and stored in the DRAM memory.

This means that such characterization bits, or an annotation structure, can be omitted when data is swapped out to disk and reinstated when read back from memory. The annotation structure can be reinstated by examining the annotated data (the page data in memory) itself, or by setting a default value.

For example, data may be compressed and stored in memory, where each page has a corresponding compression bit indicating whether it is compressed. When this data is swapped out to disk, the compression bits may be omitted. When the data is reinstated in DRAM memory, the compression bits may be reconstructed. This may be done by examining the data itself and making a determination of whether the data is compressed. Alternately, a default value, likely indicating non-compressed, may be used for the reinstated data.

This principle may be used for other characteristics as well. Again, page usage bits may be deleted when a page is written out to disk. Once reinstated, a default value of accessed (since it was just brought in) can be used initially.

Vectors such as bit vector 310 and 320 in FIG. 3A and bit vector 330 in FIG. 3B offer a snapshot view of a characteristic. These vectors may be compiled and stored in an array in order to give a more meaningful look at that particular characteristic.

Figure 4:
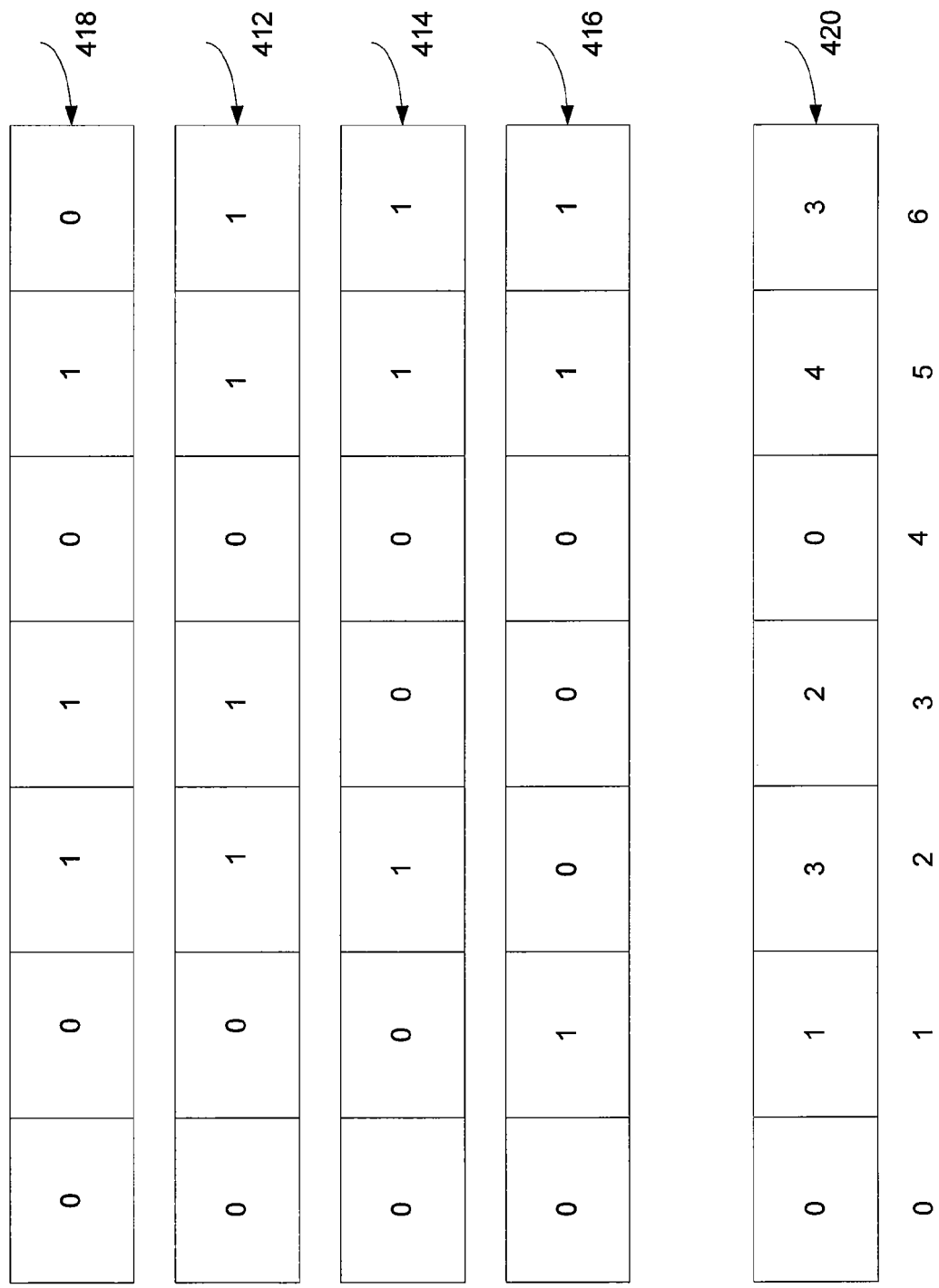
FIG. 4 illustrates an array of bit vectors used to generate histogram values according to an embodiment of the present invention.

FIG. 4 illustrates an array of bit vectors used to generate histogram values according to an embodiment of the present invention. This figure includes bit vectors 412, 414, 416, and 418, and histogram values 420. The histogram values may be for a number of page tables, here labeled 0-6. Alternately, the histogram values may each be for a part of a page table or multiple page tables.

In this specific example, individual bit vectors are stored in one of four locations. Here, bit vector 412 is written to first, followed by bit vectors 414, 416, and 418 in sequence. The vector characteristics have a value 0 or 1 and the characteristics for each page, or portion of the page or pages, are added to give histogram values 420. For example, page 0 has that characteristic values of 0 for each vector, thus its histogram value is 0. Conversely, page 5 has a characteristic value of one for each of the bit vectors, thus its histogram value is four.

In a specific embodiment of the present invention, one particular characteristic tracked by such a histogram is page usage. Accordingly, each bit vector 412, 414, 416, and 418, indicates whether a page has been used during a period of time. Again, this is useful in determining which pages may be removed in the event of the page fault.

The histogram values 420 provide even greater insight as to which pages can be moved from memory to disk. The histogram values 420 provide not just information as to whether a page has been accessed during a period of time, but during how many periods of time the page was accessed. For example, in the event of a page fault, pages 0 and 4 are better candidates for eviction than page 1; page 1 has at least been accessed. However, if the most recent bit vector, bit vector 418, was the only information available, pages any of the pages 0, 1, 4, or 6 might be evicted.

In this particular example, there are four bit vectors whose values are added to generate a histogram value. In other embodiments of the present invention, other numbers of bit vectors may be added to generate a histogram value. Also, in this example, each bit in the bit vectors is equally weighted. In other embodiments of the present invention, the weighting may be unequal. For example, a more recent bit vector entry may be more highly weighted, on the theory that a page that has been recently accessed is more likely to be accessed again than a page that was more remotely accessed.

Again, in this example, bit vector 412 was written to first, thus it is the oldest bit vector. When a new snapshot or bit vector is to be incorporated in the histogram, this oldest bit vector is typically overwritten, though variations of this are possible consistent with embodiments of the present invention. One example of how to overwrite the vector 412 is shown in the following figures.

Figure 5A:
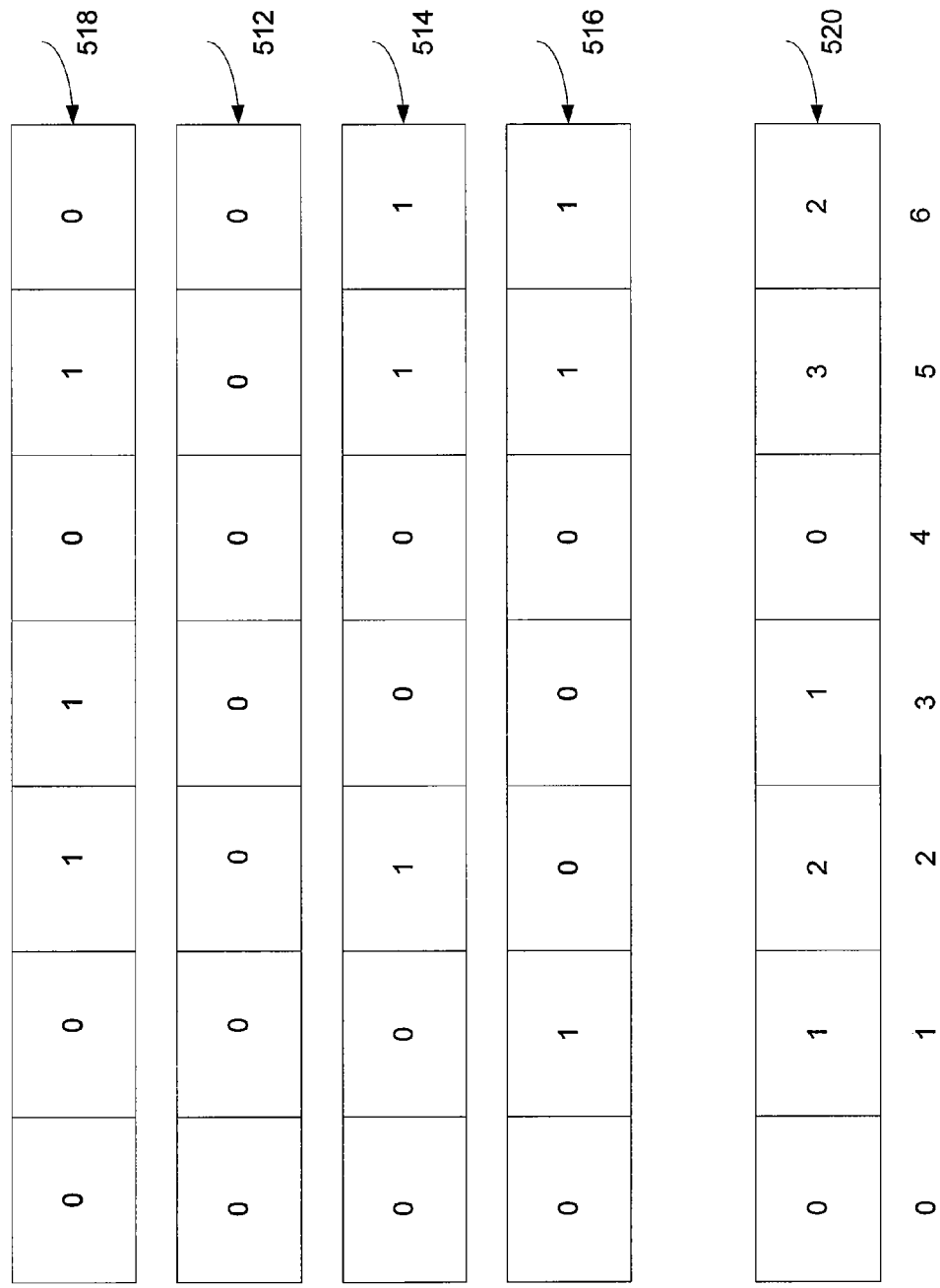

FIGS. 5A and 5B illustrate a method of overwriting a bit vector and updating histogram values according to an embodiment of the present invention. In FIG. 5A, bit vector or array line 512 is cleared such that each of its bits is reset to zero. The histogram values 520 are updated accordingly. For example, the value for page 2 in bit vector 512 is reset from a one to a zero. Accordingly, its histogram value is reduced from a 3 to a value of 2. Embodiments of the present invention may implement this in various ways. For example, the values for the bit vector or array line 512 to be cleared can be subtracted from the histogram values 520, after which the bit vector or array line 512 can be cleared. Alternately, the histogram values 520 may be implement as continuous totals of the lines in the array, such that when line 512 is cleared or reset to zero, histogram values 520 are updated automatically.

In FIG. 5B, a new bit vector 519 is written to the previously cleared location. The histogram values 520 are updated accordingly. For example, the page 0 value of bit vector or array line 519 is a 1, accordingly the histogram entry is incremented from a value of zero to a value of one.

As vector 519 is written to the bit vector array, the data being tracked continues to be produced. This makes it difficult to read data in a bit vector. Accordingly, an embodiment of the present invention writes data to two bit vectors. While data is written to one bit vector, it can be read from the other. In one embodiment of the present invention, while a histogram is being updated with data from a first bit vector, data can be written to a second bit vector. One method of doing this is shown in the following figures.

FIG. 6 illustrates a histogram including an array of bit vectors, as well as two bit vectors that may be used in updating the histogram according to an embodiment of the present invention. This figure includes a histogram including the bit vectors vector 1 620, vector 2 630, vector 3 640, and vector 4 610, which are used to generate histogram totals 650, as well as current bit vectors 660 and next bit vector 670.

The previously generated characteristic data is stored in bit vectors 610, 620, 630, and 640. These bit vectors generate histogram totals 650. Data is written to the current bit vectors 660. Once the data has been written to the current bit vector 660, that data replaces the oldest bit vector of the bit vectors 610, 620, 630, and 640. At that time, data can be written to the next bit vectors 670. After the current bit vector 660 has been copied to the oldest bit vector 610, 620, 630, or 640, the current bit vector 660 may be cleared. An example is shown in the following figures.

Figure 7A:
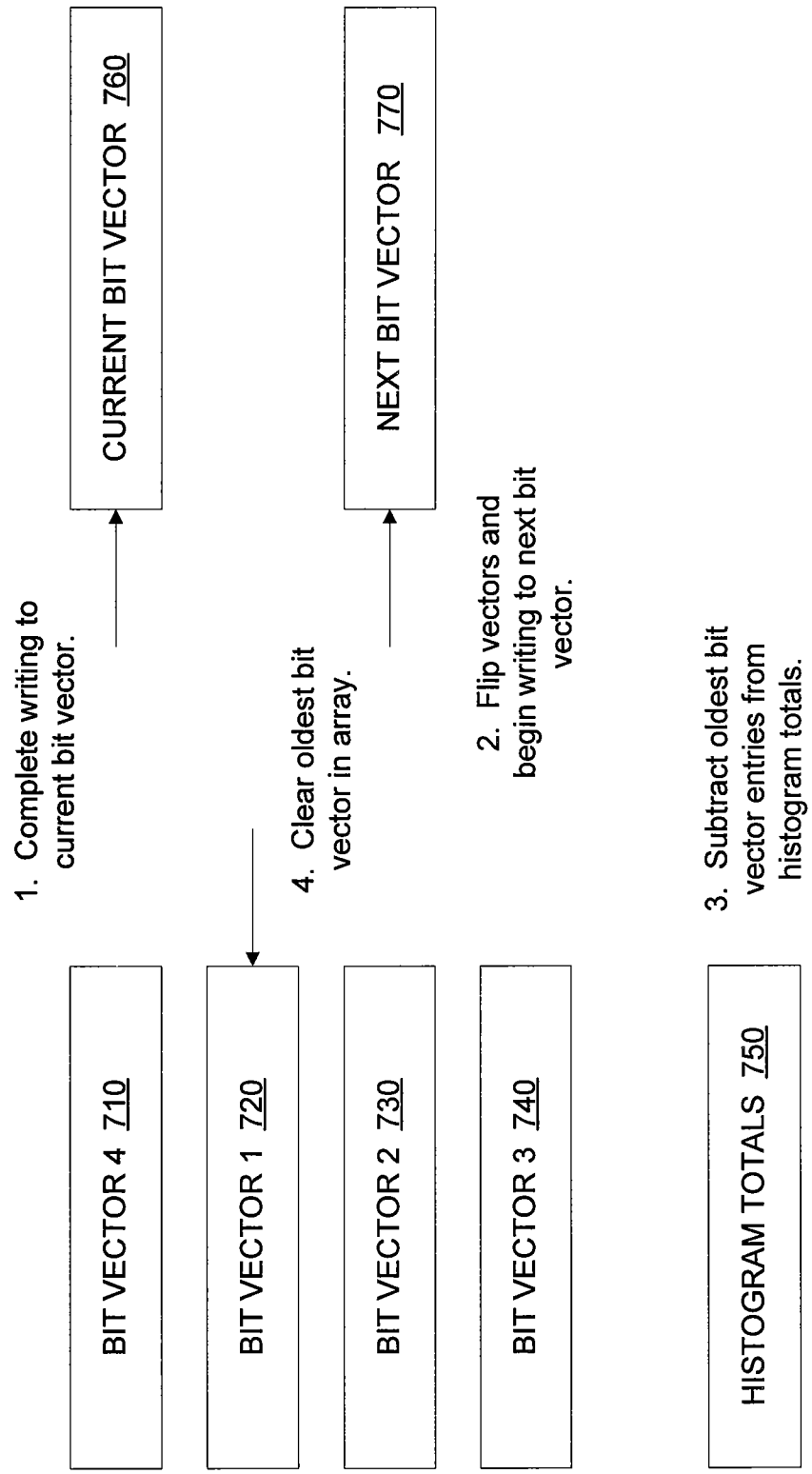
FIGS. 7A through 7C illustrate a method of updating histogram totals according to an embodiment of the present invention.
Figure 7B:
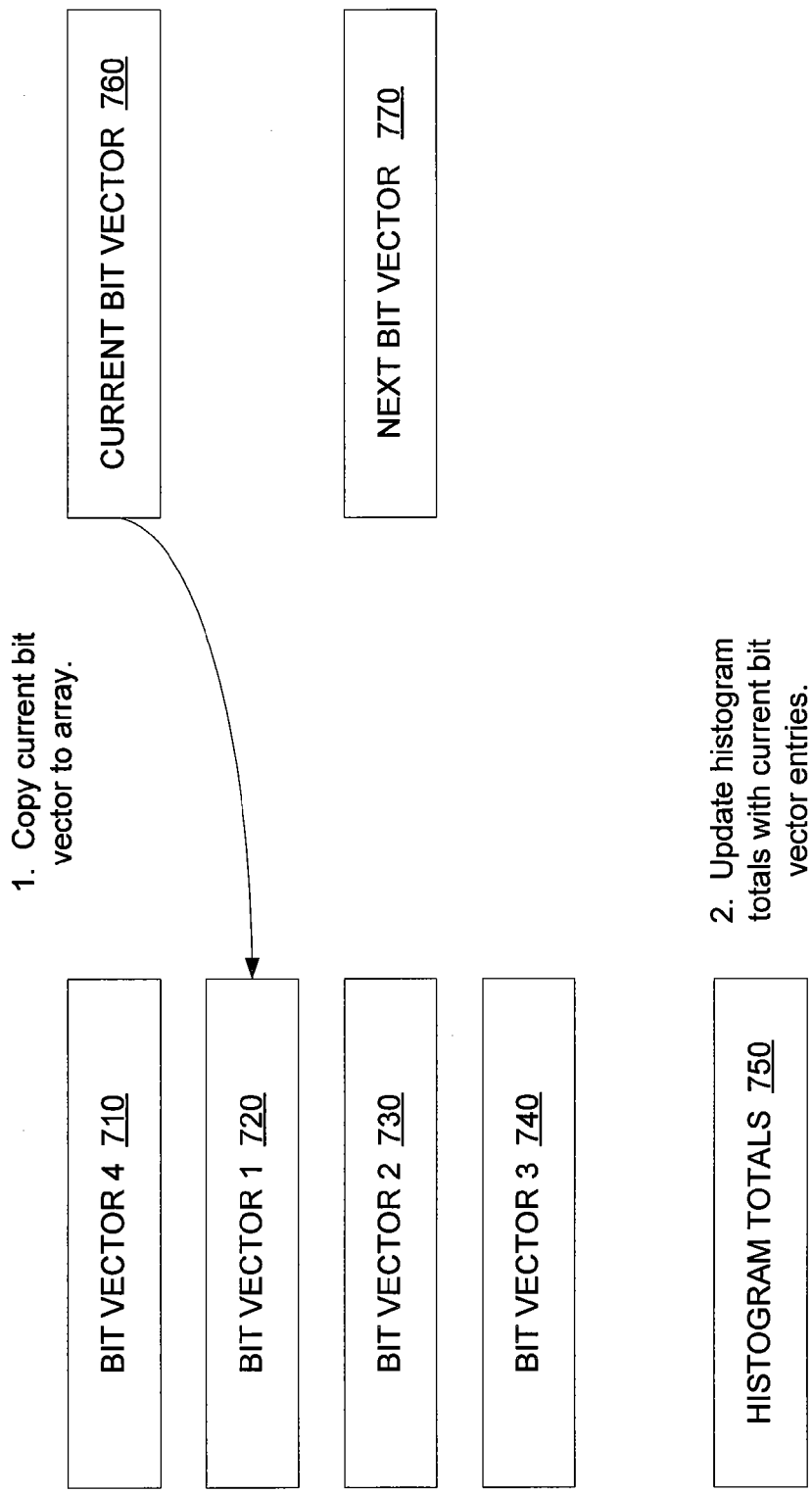
Figure 7C:
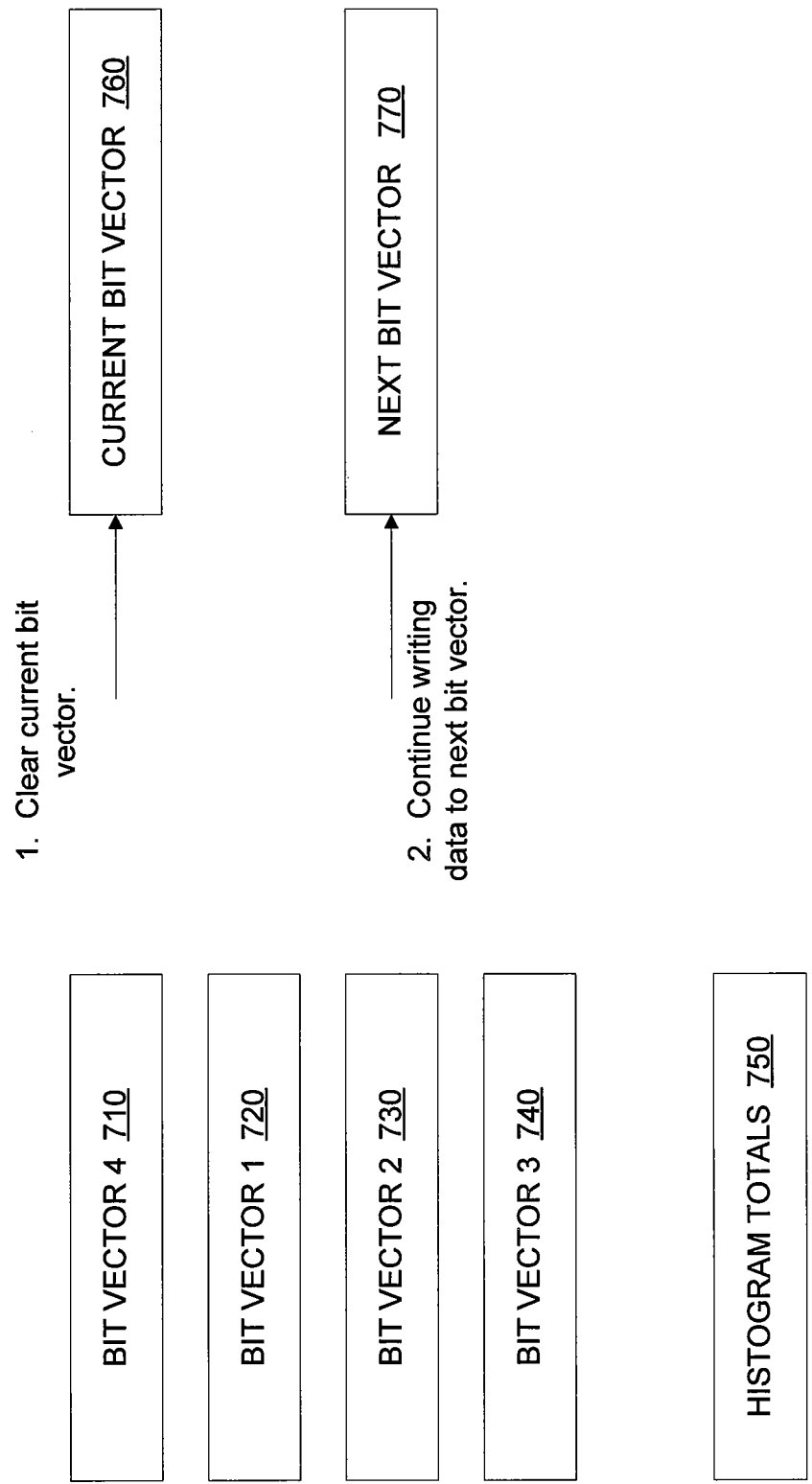

FIGS. 7A through 7C illustrate a method of updating histogram totals according to an embodiment of the present invention. These figures include histogram totals 750, which are generated by values in bits vectors vector 1 720, vector 2 730, vector 3 740, and vector 4 710. These bit vectors are updated by the current bit vectors 760 and next bit vector 770.

In FIG. 7A, writing to current bit vector 760 is completed. At this point, the bit vectors can be flipped and new data can be written to the next bit vector 770. The values of the array line or bit vector to be overwritten are subtracted from the histogram total 750, though this may be skipped if the histogram totals 750 are automatically updated with changes in the array lines or bit vectors 710-740. Once the histogram totals 750 are updated, values in bit vector 1 720 may be cleared. In FIG. 7B, the current bit vector 760 is copied to bit vector 1 720 and the histogram totals are updated with the new bit vector entry values.

In FIG. 7C, the current bit vector 760 can be cleared, such that it is ready for data after data has been written to the next vector 770. In this way, data is always being written to one of these two bit vectors, that is, either the current bit vector 760 or next bit vector 770.

Using a current and a next bit vector allows data to always be written to one vector or the other. After data is written to one, the buffers flip and data is written to the second. Data from the first can then be used to update a histogram value, before being cleared.

In various embodiments of the present invention, these various functions may be done by either software or hardware. In a specific embodiment of the present invention, hardware is used to accelerate the copying and clearing of these bit vectors. A flowchart illustrating the operation of such an embodiment is shown in the following figure.

Figure 8:
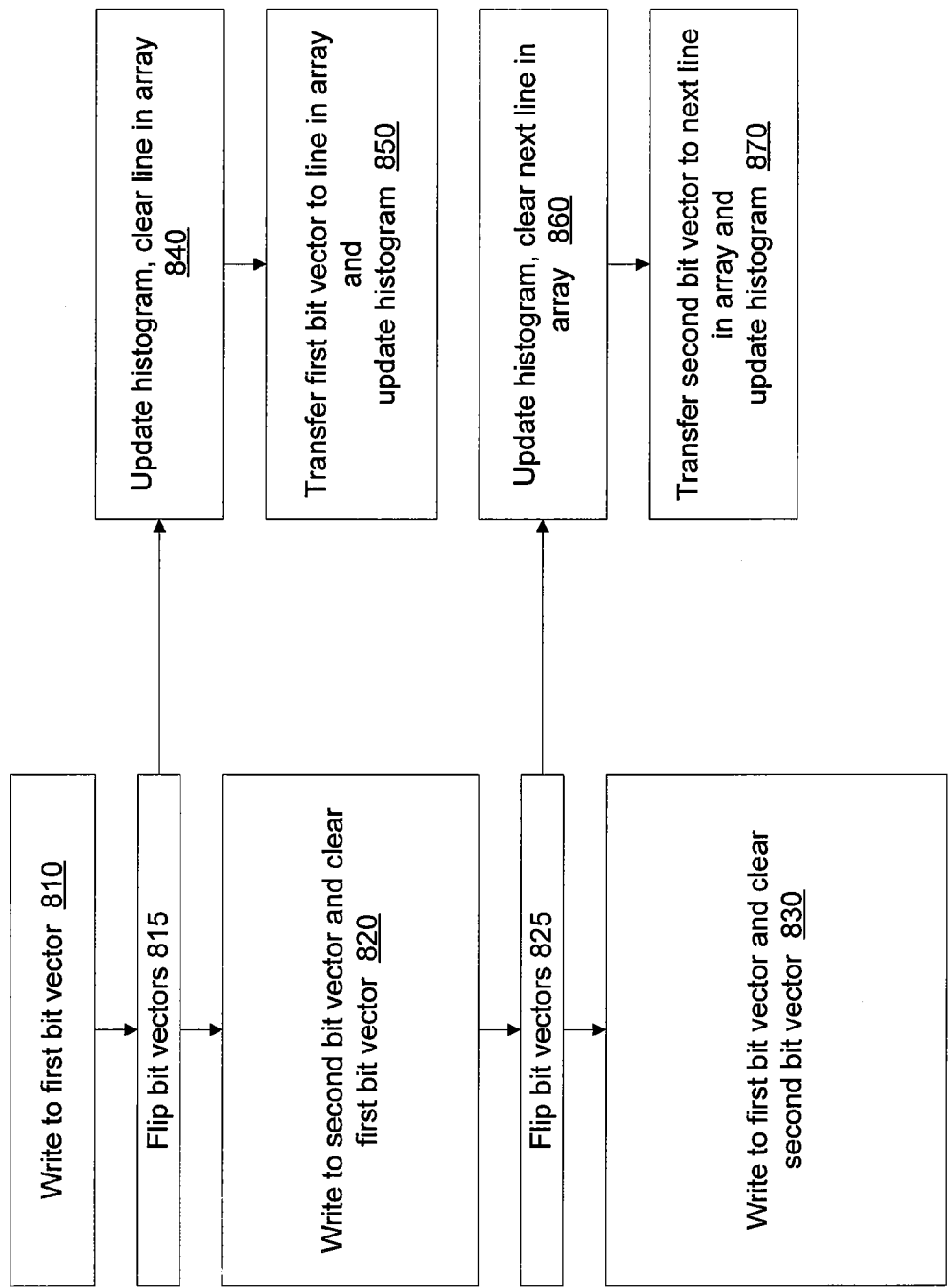
FIG. 8 is a flowchart illustrating a method of updating histogram values according to an embodiment of the present invention.

FIG. 8 is a flowchart illustrating a method of updating histogram values according to an embodiment of the present invention. Activities on the left side of this figure illustrate how either a first or second bit vector is always available to receive data, and how these vectors are flipped and cleared after data writing is complete. Activities on the right side of this figure illustrate activities performed by a histogram array using one of the bit vectors, while data is being written to the other bit vector.

Specifically, in act 810, data is written to a first bit vector. In act 815, the bit vectors are flipped. Data is written to a second bit vector in act 820. In act 840, histogram totals are updated by subtracting entries in the bit vector array line that is to be overwritten. Once the totals are updated, the array line can be cleared in act 840. In act 850, the first bit vector, now complete, is transferred or copied to the bit vector array line and the histogram is updated accordingly. Also in act 820, the first bit vector, having been copied, is cleared.

In act 825, the data writing to the second bit vector is completed, and the bit vectors are flipped once again. Following this, data is written to the first bit vector in act 830. In act 860, histogram totals are updated by subtracting entries in the bit vector array for the next array line to be overwritten. Once the histogram totals are updated, the next array line can be cleared, also in act 860. In act 870, the second bit vector, now complete, is transferred to the next line in the bit vector array and the histogram totals are updated accordingly. Also in act 830, the second bit vector, now copied, can be cleared.

In the above embodiments, two bit vectors are used to provide data for a histogram. In various embodiments of the present invention that do not require a histogram, two bit vectors may be written to in the same alternating manner. The bit vector that is not being written to may either be read from or otherwise used, or copied to another location to be read or otherwise used.

In various embodiments of the present invention, data is written to one vector for a certain duration. The length of this duration or period may be determined by one or more factors. For example, the length may be determined by a certain number of clock cycles. Alternately, the length may be determined by a specific number of instructions or activities. In other embodiments, certain events may trigger the end of the duration. For example, a page flip or other event may trigger the end of data being written to a vector and initiate a vector flip.

The above embodiments of the present invention provide fast and efficient ways of tracking usage data for pages resident in memory. This usage information is then consulted to determine which pages should be swapped out to disk in favor of new data.

However, some data is never swapped out to disk. This data remains resident in memory and long as it is needed, then it is deleted or overwritten. In such a case, it is unnecessary to track usage data for these pages; it stays in the memory until it is deleted. Accordingly, further embodiments of the present invention provide mechanisms whereby the usage of such pages is not tracked. This further improves the efficiency of the tracking circuits, methods, and apparatus provided by embodiments of the present invention.

For example, graphics data to be viewed on a monitor is rendered by a graphics processor and stored in a region of memory referred to as a frame buffer. After being rendered, the data is read from the frame buffer and displayed. Due to its transitory nature, that data is not written to disk, rather, it remains in memory until it is used, then it is overridden by new data.

In a more specific example, rendered pixel data is stored in a portion of memory referred to as a back buffer. Data is displayed from a portion of memory referred to as a front buffer. When data in the front buffer has been displayed, the buffers flip, and data in what was the back buffer, which is now the front buffer, is displayed, while rendered pixel data is stored in what was the front buffer, but is now the back buffer. The data in the front buffer and the back buffer is not to be overwritten until it is used, and it is not to be written out to disk. Thus, the usage data for these pages in memory does not need to be tracked. Rather, tracking these pages consumes resources without accomplishing anything. Accordingly, page usage bit updates for these pages can be suppressed or inhibited.

Similarly, video streaming data may be received, for example, via a bus connected to the media communications processor 160. This dated is received, stored in memory, and displayed. This data is not overwritten until it is used, and unless it is being saved, it is not written to disk. Thus, this data does not need to be tracked, and their page usage bit updates can be suppressed as well.

Accordingly, embodiments of the present invention provide circuits, methods, and apparatus that reduce or eliminate page usage updates for pages containing this type of data. Typically, addresses of data that are not to be swapped out to disk are determined. These addresses are then locked, that is, they are identified as pages that are not to be written out to disk. These pages are then not tracked by page usage tracking mechanisms such as, but not limited to, the bit vectors described above. An example is shown in the following figure.

Figure 9:
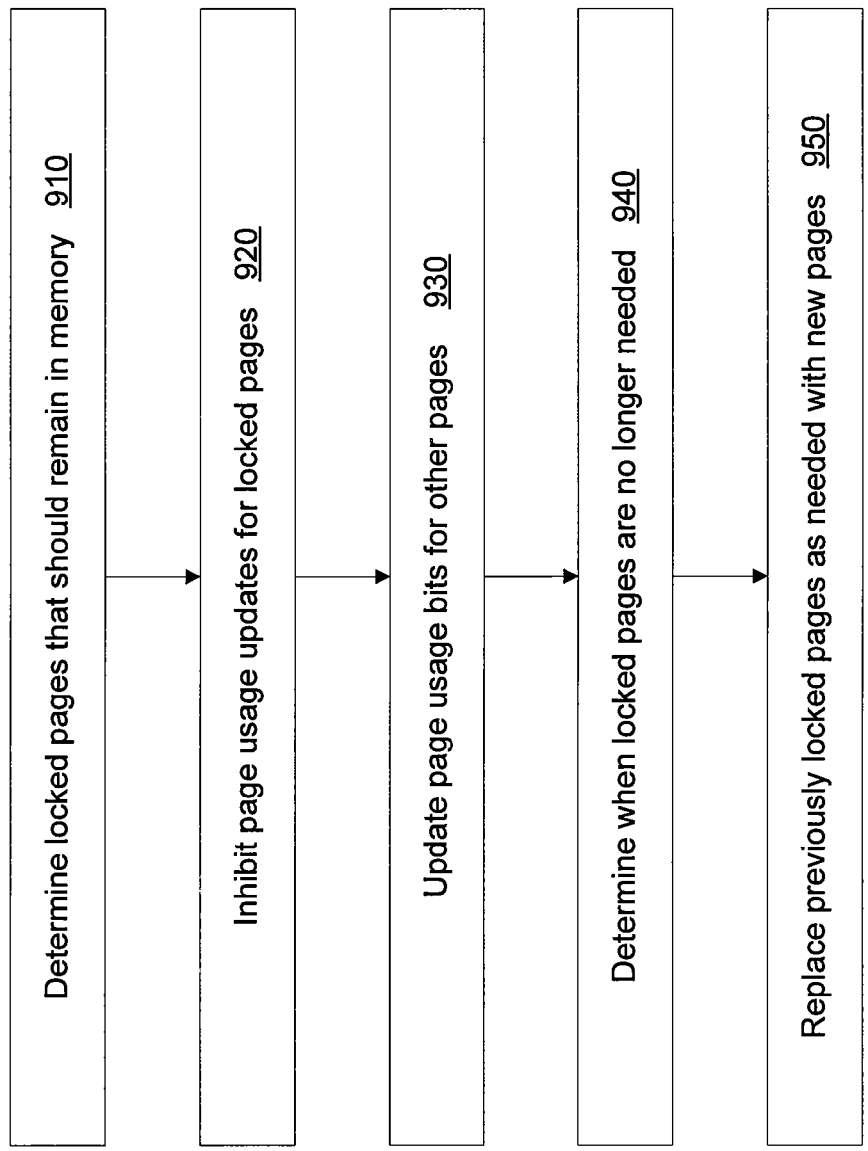
FIG. 9 is a flowchart illustrating a method of inhibiting page usage bit updates according to an embodiment of the present invention.

FIG. 9 is a flowchart illustrating a method of suppressing page usage bit updates according to an embodiment of the present invention. In this example, pages that should remain in memory, that is, not written out to disk are identified. The usage of these pages is not tracked, while the usage of other pages is tracked using bit vectors, as described above. When the pages that are not being tracked are no longer needed, they can be deleted or overwritten with new data.

In some embodiments of the present invention, the bit vectors that track page usage do not include locations for pages that are not to be swapped out to disk. In other embodiments of the present invention, the bit vectors do include such locations, but to save resources, the locations are not updated with usage information.

Specifically, in act 910, pages that should remain in memory are identified. For simplicity, these pages are referred to as "locked" pages, that is, they remain in memory and are not written out to disk. In act 920, the page usage bit updates for these pages is inhibited. In act 930, page usage bits for the other pages are updated. In act 940, it is determined when the locked pages are no longer needed. For example, the pages may contain display data that has been displayed and is no longer needed. These pages can then be replaced as needed with new pages in act 950.

The pages for which usage updates should be inhibited can be identified in a number of ways. In a specific embodiment of the present invention, a specific address range or ranges are used for such pages. That is, data written to addresses in the identified address range are not be swapped out to disk, rather, they remain in memory as long as needed and their page usage bits, if present, are not updated. Other examples are shown in the following figures.

Figure 10:
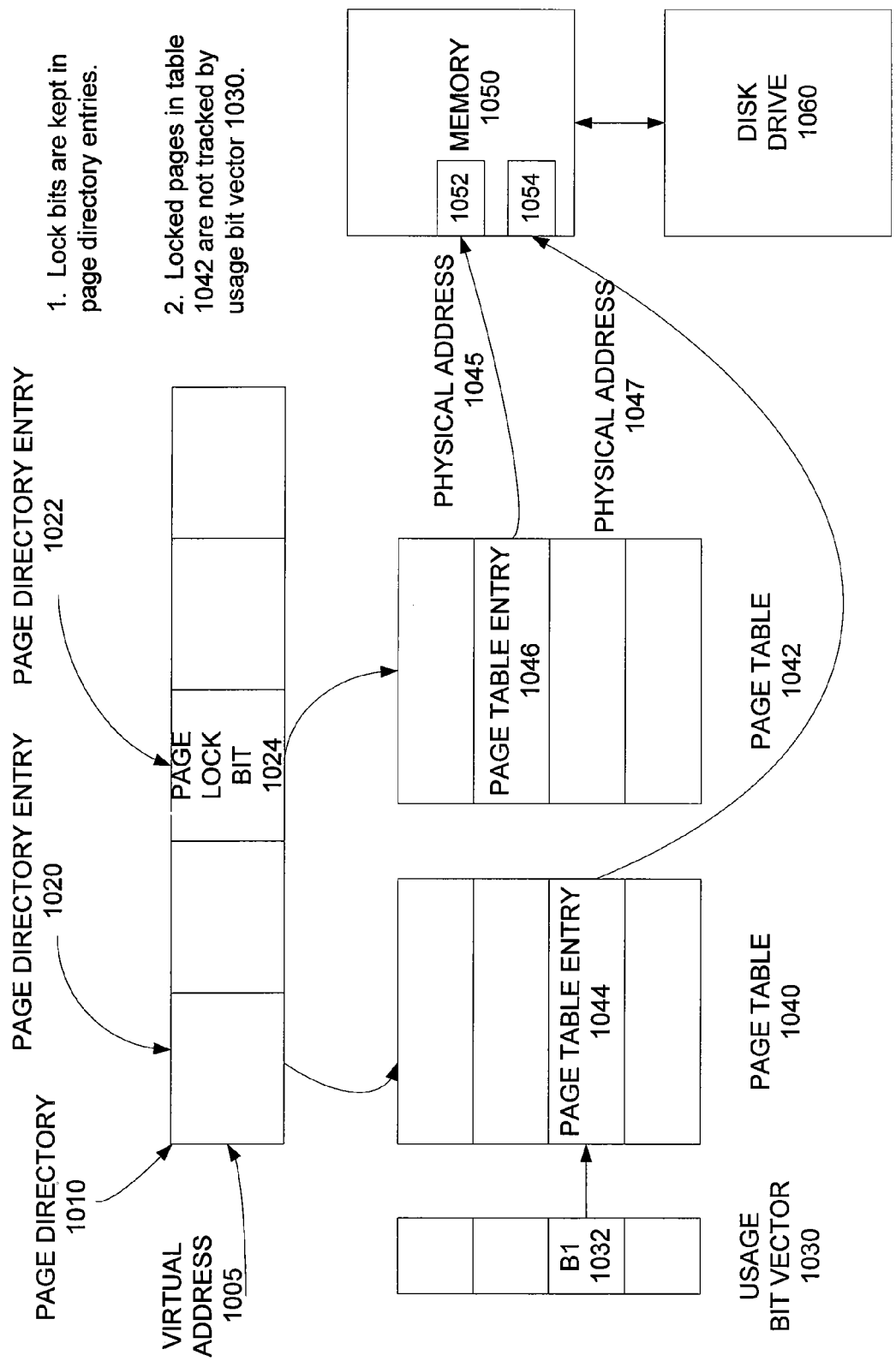
FIG. 10 illustrates a method of identifying pages for which page usage bit updates are inhibited using bits in page directory entries according to an embodiment of the present invention.

FIG. 10 illustrates a method of identifying pages for which page usage bit updates are inhibited using bits in page directory entries according to an embodiment of the present invention. This figure illustrates a memory hierarchy including a page directory 1010, which includes a number of page directory entries 1020 and 1022, a usage bit vector 1030, page tables 1040 and 1042, memory 1050, and disk drive 1060.

Page directory 1010 includes page directory entries 1020 and 1022. Page directory entry 1020 points to page table 1040, which includes page table entry 1044. Similarly, page directory entry 1022 points to page table 1042, which includes page table entry 1046. Page table entry 1044 tracks page 1054 in memory 1050, while page table entry 1046 tracks page 1052 in memory 1050. In this arrangement, a bit, referred to there as a page lock bit, is set for each page table whose page table entries identify pages whose page usage information should not be updated. In other embodiments, one or more bits may be used to convey this and other information. In a specific embodiment of the present invention, this bit is an unused lower address bit in the page directory entry. In other embodiments of the present invention, other bits in the page directory entry may be used, or bits may be added to one or more of the page directory entries for this purpose.

In this example, a page lock bit 1024 is set in page directory entry 1022. Accordingly, the pages identified by page table entries in page table 1042 are not tracked by usage bit vector 1030. Page directory entry 1020 does not have this bit set. Accordingly, bit B1 1032 in usage bit vector 1030 tracks the usage of the page identified by page table entry 1044 in page table 1040.

This arrangement works well but has at least two disadvantages. One is that it is difficult to change the page lock bits once the page directory has been assembled. Another is that each page in a page table is treated the same, that is, the resolution for selectively inhibiting page usage dates is limited. Accordingly, other embodiments of the present invention inhibit page usage bit updates on a page table entry level. An example is shown in the following figure.

Figure 11:
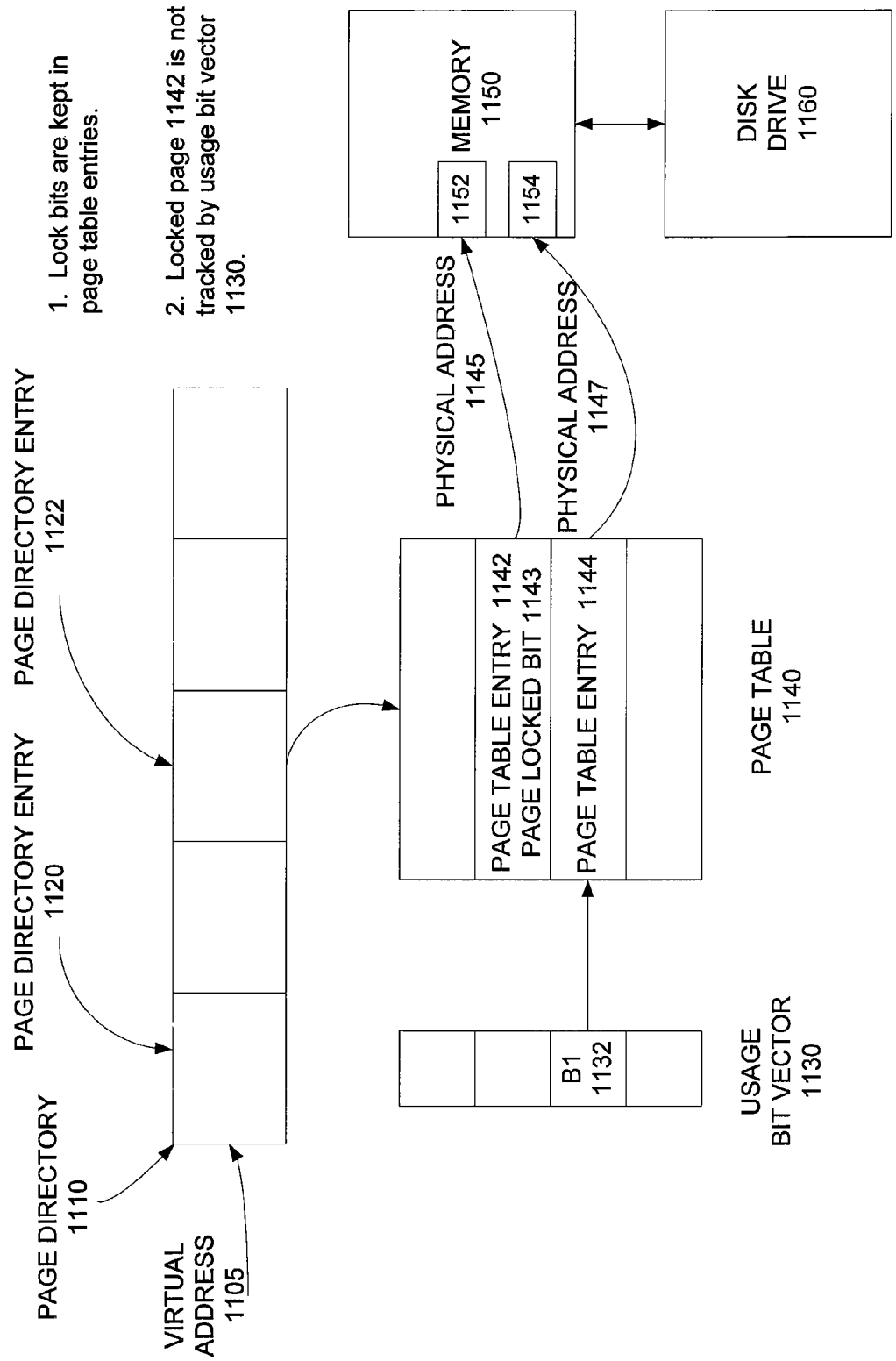
FIG. 11 illustrates a method of identifying pages for which page usage updates are inhibited using bits in page table entries according to an embodiment of the present invention.

FIG. 11 illustrates a method of identifying pages for which page usage updates are inhibited using bits in page table entries according to an embodiment of the present invention. This figure illustrates a memory hierarchy including a page directory 1110, which includes a number of page directory entries 1120 and 1122, a usage bit vector 1130, page table 1140, memory 1150, and disk drive 1160. In this arrangement, page lock bits are set for each page table entry that identifies a page that for which page usage update information should be inhibited.

In this example, the lock bit 1143 in page table entry 1142 is set. Accordingly, page usage information for page 1152 is not updated using the usage bit vector 1130. However, page usage information for page 1154 is tracked, specifically by bit B1 1132 in usage bit vector 1130.

This arrangement also works well, however, the number of pages can be quite high, and managing the lock bits in the page table entries can consume a great deal of resources, perhaps more than is gained by not tracking the locked pages. Accordingly, another embodiment of the present invention provides address registers that identify a range of addresses for which page usage updates should be suppressed. An example is shown in the following figure.

Figure 12:
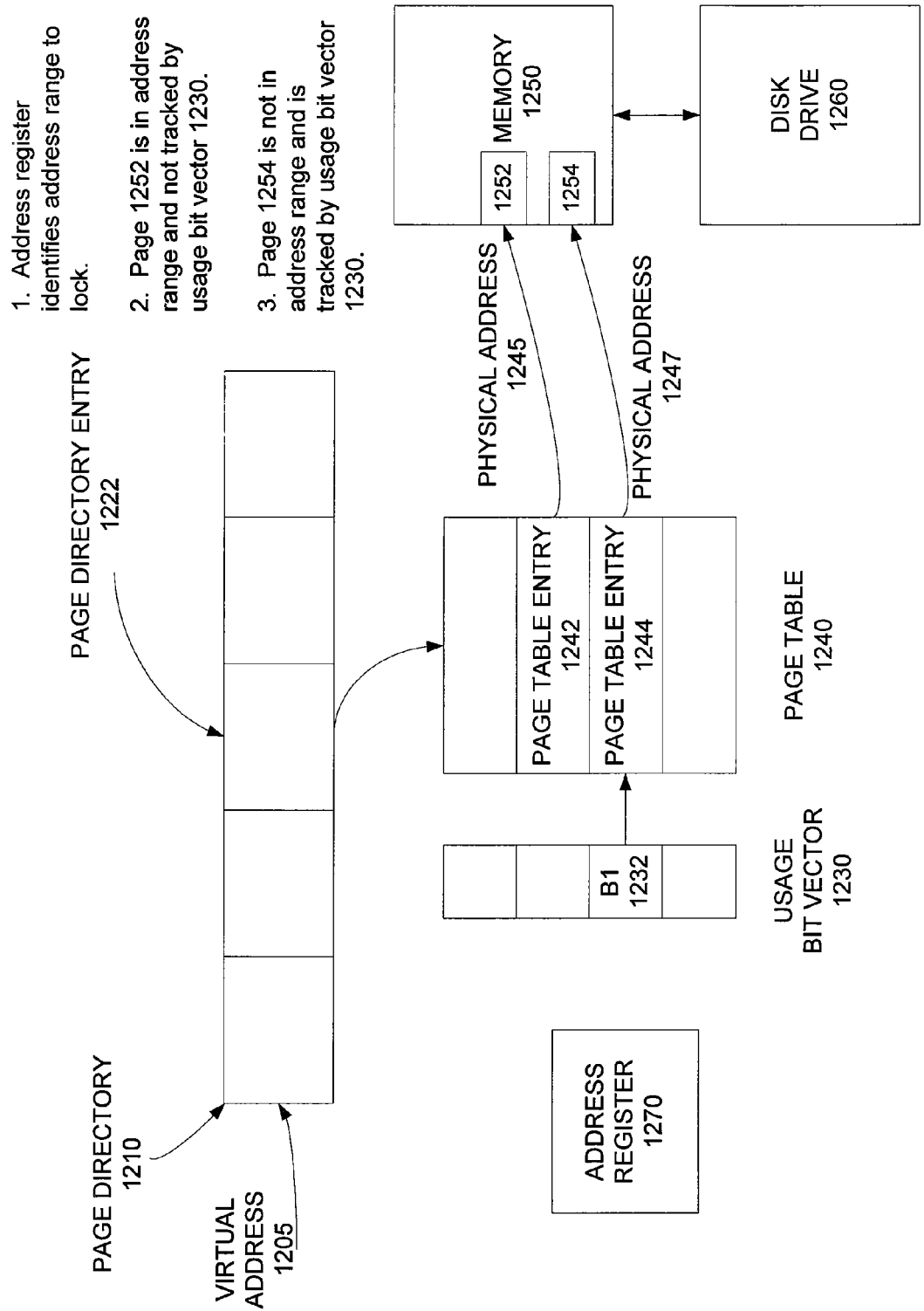
FIG. 12 illustrates a method of identifying pages for which page usage bit updates are inhibited using address registers according to an embodiment of the present invention.

FIG. 12 illustrates a method of identifying pages for which page usage bit updates are inhibited using address registers according to an embodiment of the present invention. This figure illustrates a memory hierarchy including a page directory 1210, which includes a number of page directory entries 1220 and 1222, a usage bit vector 1230, page table 1240, memory 1250, disk drive 1260, and address registers 1270. In this arrangement, one or more address registers 1270 identify ranges of addresses for which page usage updates should be inhibited.

In this example, the address register 1270 identifies page 1252 as a page that should remain in memory and not be swapped to disk. Accordingly, usage bit vector 1230 does not track the usage of page 1252. Page 1254 lies outside of this range, therefore bit B1 1232 in usage bit vector 1230 tracks the usage of page 1254.

As with the above examples, this arrangement works well. However, since it is a hardware solution, it is not easily scalable. That is, as more address ranges need to be identified, more address registers 1270 are needed. This means that often, either not be enough address registers are available or multiple address registers 1270 remain unused, unnecessarily consuming die area. Accordingly, further embodiment of the present invention use a software solution, specifically they use segments. The segments may alternately be referred to as context DMAs. These segments operate in parallel with page tables to identify and attach properties to memory address ranges. An example is shown in the following figure.

Figure 13:
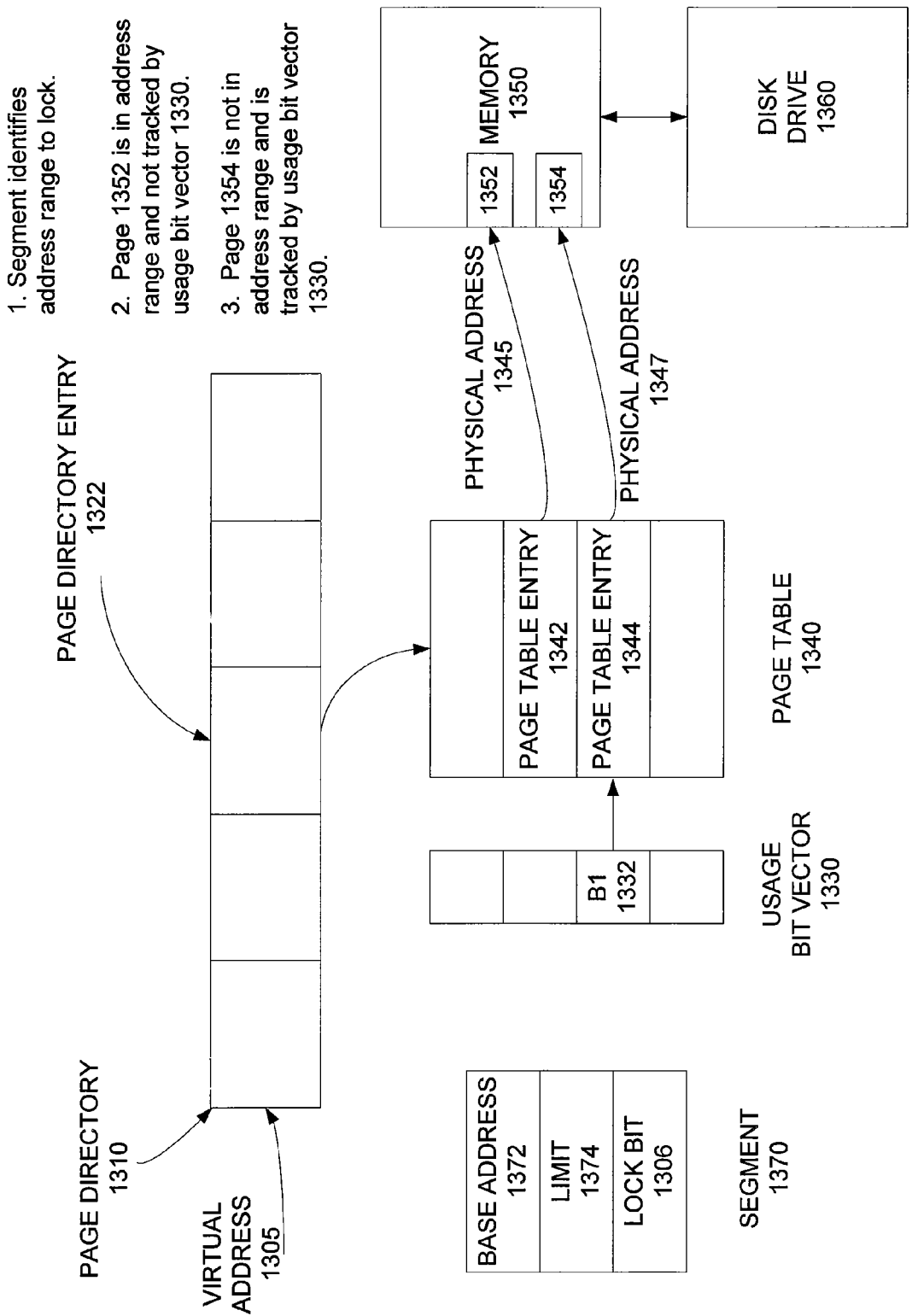
FIG. 13 illustrates a method of identifying pages for which page usage updates are inhibited using segments according to an embodiment of the present invention.

FIG. 13 illustrates a method of identifying pages for which page usage updates are inhibited using segments according to an embodiment of the present invention. This figure illustrates a memory hierarchy including a page directory 1310, which includes a number of page directory entries 1320 and 1322, usage bit vector 1330, page table 1340, memory 1350, disk drive 1360, and segment 1370. In this arrangement, one or more segments 1370 identify ranges of addresses for which page usage bit updates are inhibited.

In this example, the segment 1370 identifies page 1352 as a page that should remain in memory and not be swapped to disk. This range is identified by a starting or base address 1372, and a limit 1374, which indicates the range of addresses covered by the segment. The segment 1370 also includes a number of properties, one of which in this example is lock bit 1306. Accordingly, usage bit vector 1330 does not track the usage of page 1352. Page 1354 lies outside this range, therefore bit B1 1232 in usage bit vector 1330 tracks the usage of page 1354.

This solution works quite well. Since it is a software solution it is easily scalable as pages move in and out of memory. It is also highly flexible and typically does not need new hardware or software to implement, though some embodiments of the present invention may incorporate specialized or other hardware or software. The capacity to implement segments is available but not often used. Typically, one segment with a starting address of zero and an index that equals or exceeds the size of the memory is used, such that software supporting the use of segments does not have any effect on the paging system that is used.

In the above examples, page usage updates are inhibited or suppressed. In these and other embodiments of the present invention, either the collection or updating of other page characteristics are inhibited or suppressed. For example, the collection or updating of so called "dirty bits" can be inhibited or suppressed.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of tracking page characteristics in a memory system, the method comprising:
storing a plurality of pages in a memory;
determining a first number of pages in the plurality of pages stored in memory that are not be swapped out to a hard-disk drive;
reading the plurality of pages from the memory, and while reading the plurality of pages from the memory;
updating the page characteristic for a second number of pages in the plurality of pages stored in the memory; and
not updating the page characteristic for the first number of pages.

2. The method of claim 1 wherein the page characteristic is page usage.

3. The method of claim 1 further comprising:
retaining the first number of pages in the memory; then
overwriting the first number of pages with a third number of pages,
wherein the first number and third number of pages comprise display data rendered by a graphics processor.

4. The method of claim 1 further comprising:
retaining the first number of pages in the memory; then
overwriting the first number of pages with a third number of pages,
wherein the first and third number of pages comprise video data received by a Southbridge device.

5. The method of claim 1 wherein the first number of pages is identified by one or more bits in a page directory.

6. The method of claim 1 wherein the first number of pages is identified by one or more bits in each of a plurality of page table entries.

7. The method of claim 1 wherein the first number of pages is identified by an address register.

8. The method of claim 1 wherein the first number of pages is identified using one or more segments.

9. A method of tracking page usage data in a memory system, the method comprising:
storing a plurality of pages in a memory;
determining a first number of pages in the plurality of pages stored in memory that are not be swapped out to a hard-disk drive;
reading at least one of the plurality of pages from the memory, and while reading at least one the plurality of pages from the memory;
updating page usage bits for a second number of pages in the plurality of pages stored in the memory;
not updating page usage bits for the first number of pages; then
determining a page in the second number of pages having page usage data having a low value; and
replacing the page in the second number of pages with a new page.

10. The method of claim 9 further comprising:
retaining the first number of pages in the memory; then
overwriting the first number of pages with a third number of pages,
wherein the first number and third number of pages comprise display data rendered by a graphics processor.

11. The method of claim 9 further comprising:
retaining the first number of pages in the memory; then
overwriting the first number of pages with a third number of pages,
wherein the first and third number of pages comprise video data received by a Southbridge device.

12. The method of claim 9 wherein the first number of pages is identified by one or more bits in a page directory, where the page directory comprises a plurality of page tables, each page table comprising a plurality of page table entries used to translate virtual addresses to a physical addresses in memory.

13. The method of claim 9 wherein the first number of pages is identified by one or more bits in each of a plurality of page table entries, the page table entries used to translate virtual addresses to a physical addresses in memory.

14. The method of claim 9 wherein the first number of pages is identified by an address register.

15. The method of claim 9 wherein the first number of pages is identified using one or more segments.

16. A method of tracking page usage data in a memory system, the method comprising:
   storing a plurality of pages in a memory;
   determining a first number of pages in the plurality of pages stored in memory that are not be swapped out to a hard-disk drive;
   identifying the first number of pages using a segment;
   updating page usage bits in a first bit vector for a second number of pages in the plurality of pages stored in the memory; and
   not updating page usage bits for the first number of pages.

17. The method of claim 16 further comprising:
   retaining the first number of pages in the memory; then
   overwriting the first number of pages with a third number of pages,
   wherein the first number and third number of pages comprise display data rendered by a graphics processor.

18. The method of claim 16 further comprising:
   retaining the first number of pages in the memory; then
   overwriting the first number of pages with a third number of pages,
   wherein the first and third number of pages comprise video data received by a Southbridge device.

19. The method of claim 16 wherein when the page usage bits are updated in the first bit vector, page usage bits are read from a second bit vector, and when page usage bits are updated in the second bit vector, page usage bits are read from the first bit vector.

20. The method of claim 16 wherein the segment comprises:
   a base address;
   a limit; and
   a plurality of properties, including at least one bit indicating that pages corresponding to addresses identified by the base address and limit are not to have their page usage bits updated.

* * * * *